(12) United States Patent
Dudar et al.

(10) Patent No.: US 11,719,146 B2
(45) Date of Patent: Aug. 8, 2023

(54) METHODS AND SYSTEMS FOR REDUCING ENGINE EXHAUST EMISSIONS

(71) Applicant: Ford Global Technologies, LLC, Dearborn, MI (US)

(72) Inventors: Aed Dudar, Canton, MI (US); Keith Weston, Canton, MI (US); Jim Stevens, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 17/205,536

(22) Filed: Mar. 18, 2021

(65) Prior Publication Data
US 2022/0298946 A1 Sep. 22, 2022

(51) Int. Cl.
| F01N 3/20 | (2006.01) |
| F01N 3/36 | (2006.01) |
| F02D 41/02 | (2006.01) |
| F02D 41/06 | (2006.01) |
| G07C 5/08 | (2006.01) |
| B01D 53/02 | (2006.01) |
| F02B 39/10 | (2006.01) |

(52) U.S. Cl.
CPC ........... *F01N 3/2033* (2013.01); *B01D 53/02* (2013.01); *F01N 3/36* (2013.01); *F02B 39/10* (2013.01); *F02D 41/024* (2013.01); *F02D 41/064* (2013.01); *G07C 5/0808* (2013.01); *B01D 2253/102* (2013.01); *B01D 2257/702* (2013.01); *B01D 2259/4516* (2013.01)

(58) Field of Classification Search
CPC . F01N 3/2033; F01N 3/36; F01N 3/22; F01N 3/323; F01N 3/225; B01D 53/02; B01D 2253/102; B01D 2257/702; B01D 2259/4516; B01D 2258/01; B01D 53/0407; F02B 39/10; F02D 41/024; F02D 41/064; F02D 41/22; F02D 41/004; F02D 41/0035; G07C 5/0808; F02M 25/0818; F02M 25/0836; F02M 25/089
See application file for complete search history.

(56) References Cited

U.S. PATENT DOCUMENTS

| 6,167,699 B1 * | 1/2001 | Johnston | F01N 3/34 |
| | | | 123/456 |
| 6,196,202 B1 * | 3/2001 | Busato | F02M 25/089 |
| | | | 123/198 D |
| 10,054,070 B2 * | 8/2018 | Dudar | F02D 41/0037 |
| 10,578,038 B2 * | 3/2020 | Leone | F02D 9/04 |
| 2016/0319718 A1 * | 11/2016 | Dudar | F02M 25/089 |
| 2017/0082043 A1 * | 3/2017 | Dudar | F01N 3/101 |

FOREIGN PATENT DOCUMENTS

DE 102010027220 A1 1/2012

* cited by examiner

*Primary Examiner* — Sizo B Vilakazi
(74) *Attorney, Agent, or Firm* — Vincent Mastrogiacomo; McCoy Russell LLP

(57) ABSTRACT

Methods and systems are provided for routing secondary air to engine an exhaust system during a cold-start condition to reduce tail pipe emissions. In one example, a method may include operating a pump of an evaporative leak check module (ELCM) in a positive pressure mode and routing pressurized air to the exhaust passage upstream of an exhaust catalyst via an air conduit housing a first valve.

20 Claims, 7 Drawing Sheets

METHODS AND SYSTEMS FOR REDUCING ENGINE EXHAUST EMISSIONS

FIELD

The present description relates generally to methods and systems for routing secondary air to engine exhaust system during a cold-start condition to reduce tail pipe emissions.

BACKGROUND/SUMMARY

Engine emission control systems may include one or more exhaust catalysts such as three-way catalysts, NOx storage catalysts, and SCR catalysts. At catalyst light-off temperature (e.g., operational temperature), the exhaust catalyst may oxidize and reduce exhaust constituents in an exhaust gas which are then released into the atmosphere. However, during a cold-start of an engine, when a temperature of the exhaust catalyst is below the light-off temperature, the exhaust catalyst may not be able to effectively treat the reactive constituents of the exhaust gas, and as a result, cold-start emissions may increase and the toxic constituents in the exhaust gas may be directly released into the atmosphere. Further, during a cold-start, a portion of liquid fuel injected to the cylinders may not be combusted and such unburned hydrocarbons may contribute to the increased cold-start emissions.

One way to reduce cold-start emissions is to burn the hydrocarbons in the exhaust passage and decrease the time taken by the exhaust catalyst to reach light-off temperature. One example approach to burn hydrocarbons in the exhaust passage is provided by Johnston in U.S. Pat. No. 6,167,699. Therein, the engine includes a secondary air injection system including a pump capable of supplying air to the exhaust manifold. During a vehicle cold-start, secondary air is supplied to the exhaust passage to facilitate the combustion of hydrocarbons in the exhaust gases being treated by the catalytic converter.

However, the inventors herein have recognized potential issues with such a system. As one example, inclusion of a separate secondary air injection system including a dedicated pump for air supply to the exhaust passage, may add to the cost and weight to the vehicle. Inclusion of the pump may also add to the packaging concerns for the engine. The dedicated pump is only used during engine cold-starts and not useful during other engine operating conditions.

In one example, the issues described above may be addressed by a method for an engine in a vehicle, comprising opening a first valve housed in a first air conduit to flow pressurized air from a pump of an evaporative leak check module (ELCM) to an exhaust passage upstream of an exhaust catalyst while the pump is operated in a pressure mode. In this way, by using an existing engine component such as a pump of the ELCM for secondary air supply during engine cold-start conditions, cost and complexity of the engine may be reduced.

As one example, an engine may be equipped with an ELCM including a pump used for diagnostics of an evaporative emissions control (EVAP) system primarily carried out during engine-off conditions. A first passage may lead from the ELCM pump to the exhaust passage, the first passage including a first valve. Further, the engine may also include an electric booster to increase boost pressure during higher engine load conditions. A second passage may fluidically couple the e-booster to the exhaust passage, the second passage including a second valve. During a cold start condition, the ELCM pump may be operated to generated pressurized air and the first valve may be actuated to an open position to route the pressurized air directly to the exhaust passage. Also, during the cold-start condition, the electric booster may be operated and the second valve may be opened to route pressurized air directly from the intake passage to the exhaust passage. The air supplied to the exhaust passage may cause the unburned hydrocarbons in the exhaust passage to combust and produce heat. The heat generated at the exhaust passage causes the temperature of the exhaust catalysts to increase. Upon the exhaust catalysts reaching their respective light-off temperatures, the operation of the ELCM pump and the electric booster to supply secondary air to the exhaust passage may be discontinued.

In this way, by using existing engine components such as the ELCM pump or the e-booster to supply secondary air to the exhaust passage during cold-start conditions, additional components such as a separate secondary air injection system including a dedicate pump may be eliminated. By eliminating the secondary air injection system, engine cost, weight, and complexity may be reduced. The technical effect of supplying air to the exhaust passage during cold start conditions by operation of the ELCM pump or the e-booster is that the heat generated from combustion of the hydrocarbons in the exhaust passage may be used to expediently increase the catalysts' temperature to above their respective light-off temperatures. Overall, by expediting catalyst light-off and reducing unburnt hydrocarbons in the exhaust passage, emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
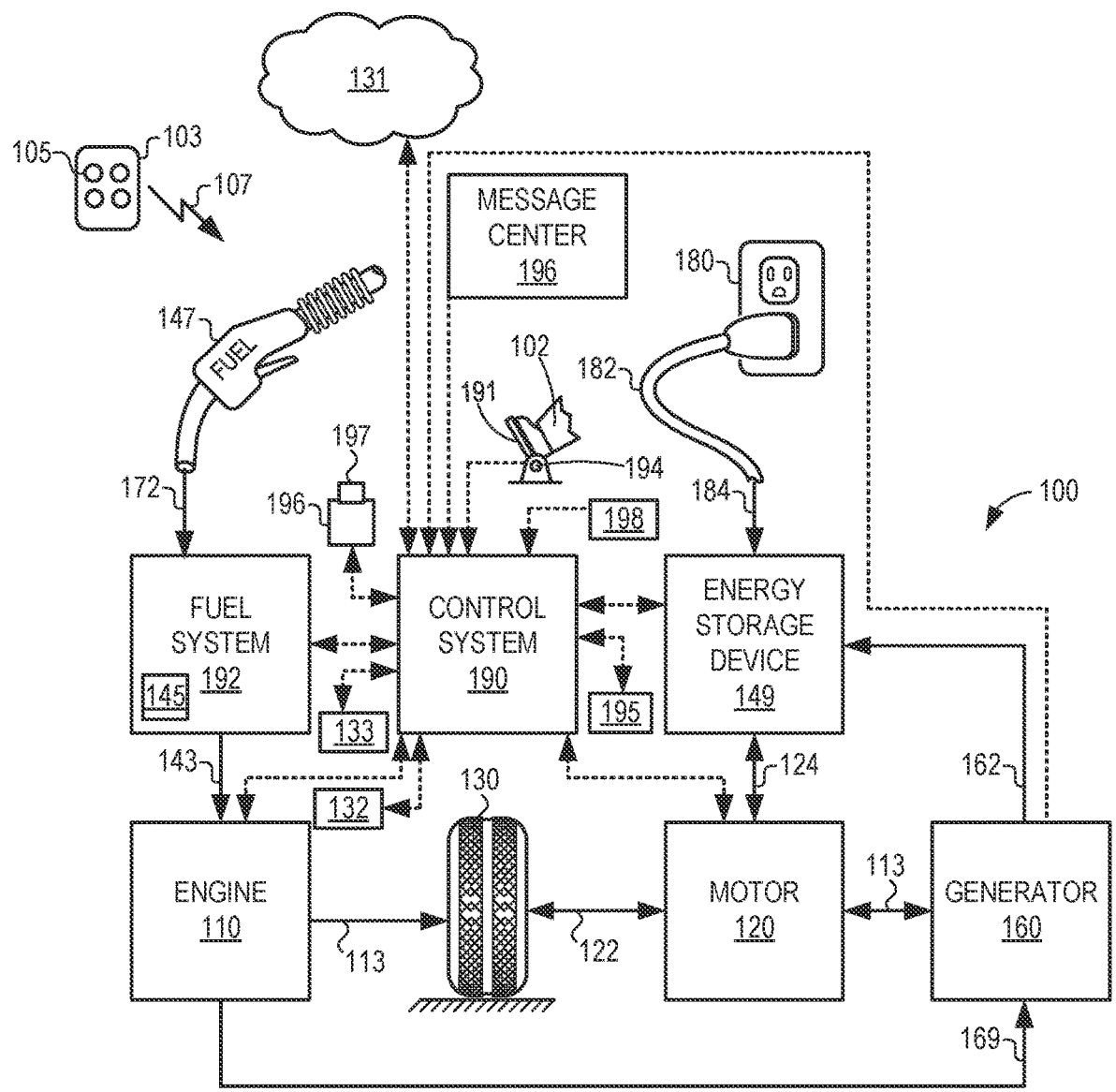
FIG. 1 schematically shows an example vehicle propulsion system.
Figure 2:
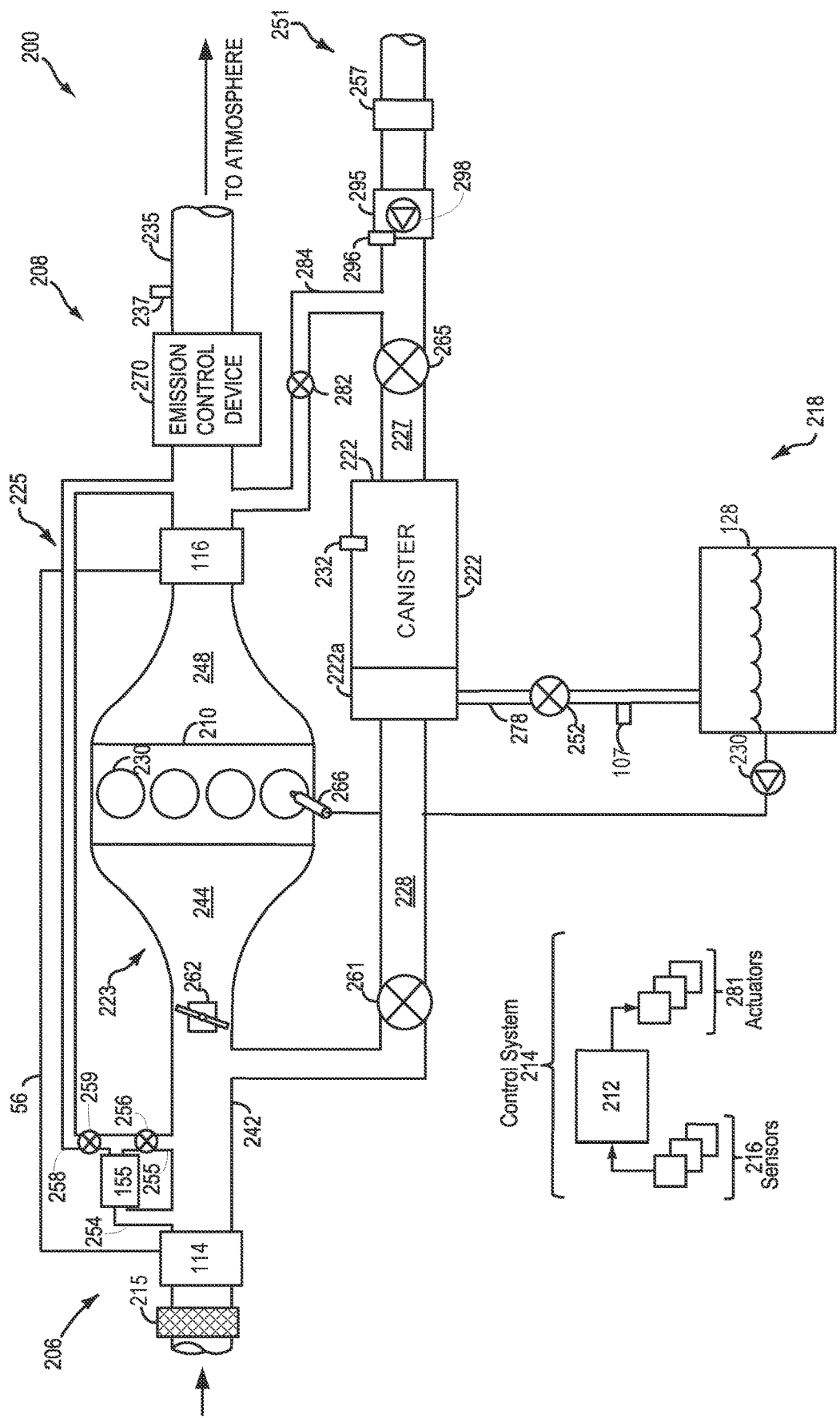
FIG. 2 shows an example engine system including an electric booster and an evaporative leak check module (ELCM).

The following description relates to systems and methods for routing secondary air to engine exhaust system during a cold-start condition to reduce tail pipe emissions. The secondary air routed to the exhaust system may facilitate combustion of unburnt hydrocarbons in the exhaust passage which causes generation of heat and expedited attainment of catalyst light-off temperature. An example hybrid vehicle is depicted at FIG. 1. An onboard engine system including an electric booster and an evaporative leak check module (ELCM) are depicted at FIG. 2. For spinning a pump of the ELCM in the forward and reverse directions, an H-bridge circuit may be utilized, such as the H-bridge circuit depicted at FIGS. 3A-3B. An engine controller may be configured to perform a control routine, such as the example routine of FIGS. 4 and 5, to supply secondary air to the exhaust passage of the engine by operating the ELCM pump and the electric booster, respectively. Example operations of the ELCM pump and electric booster to supply secondary air is further shown in FIGS. 6 and 7.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 149. For example, motor 120 may receive wheel torque from drive wheel 130 as indicated by arrow 122 where the motor may convert the kinetic energy of the vehicle to electrical energy for storage at energy storage device 149 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 149 as indicated by arrow 162.

During still other operating conditions, engine 110 may be operated by combusting fuel received from fuel system 192 as indicated by arrow 143. For example, engine 110 may be operated to propel the vehicle via drive wheel 130 as indicated by arrow 113 while motor 120 is deactivated. During other operating conditions, both engine 110 and motor 120 may each be operated to propel the vehicle via drive wheel 130 as indicated by arrows 113 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 169, which may in turn supply electrical energy to one or more of motor 120 as indicated by arrow 113 or energy storage device 149 as indicated by arrow 162. As another example, engine 110 may be operated to drive motor 120 which may in turn provide a generator function to convert the engine output to electrical energy, where the electrical energy may be stored at energy storage device 149 for later use by the motor.

In still other examples, which will be discussed in detail below, motor 120 may in some examples be utilized to spin or rotate the motor in an unfueled configuration. More specifically, motor 120 may rotate the engine unfueled, using power from onboard energy storage device 149, which may include a battery, for example. In a case where motor 120 is used to rotate the engine unfueled, fuel injection to engine cylinders may be prevented, and spark may not be provided to each of the engine cylinders.

Fuel system 192 may include one or more fuel storage tanks 145 for storing fuel on-board the vehicle. For example, fuel tank 145 may store one or more liquid fuels, including but not limited to: gasoline, diesel, and alcohol fuels. In some examples, the fuel may be stored on-board the vehicle as a blend of two or more different fuels. For example, fuel tank 145 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 143. Still other suitable fuels or fuel blends may be supplied to engine 110, where they may be combusted at the engine to produce an engine output. The engine output may be utilized to propel the vehicle as indicated by arrow 113 or to recharge energy storage device 149 via motor 120 or generator 160.

In some examples, energy storage device 149 may be configured to store electrical energy that may be supplied to other electrical loads residing on-board the vehicle (other than the motor), including operating an electric booster (e.g., electric supercharger), cabin heating and air conditioning, engine starting, headlights, cabin audio and video systems, etc. As a non-limiting example, energy storage device 149 may include one or more batteries and/or capacitors.

Control system 190 may communicate with one or more of engine 110, motor 120, fuel system 192, energy storage device 149, and generator 160. Control system 190 may receive sensory feedback information from one or more of engine 110, motor 120, fuel system 192, energy storage device 149, and generator 160. Further, control system 190 may send control signals to one or more of engine 110, motor 120, fuel system 192, energy storage device 149, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 191. Pedal 191 may refer schematically to a brake pedal and/or an accelerator pedal. Furthermore, in some examples control system 190 may be in communication with a remote engine start receiver 195 (or transceiver) that receives wireless signals 107 from a key fob 103 having a remote start button 105. In other examples (not shown), a remote engine start may be initiated via a cellular telephone, or smartphone based system where a user's cellular telephone sends data to a server and the server communicates with the vehicle to start the engine. The vehicle system 100 may include a human machine interface (HMI) 133 coupled to the vehicle dashboard via which an operator may communicate with the control system 190. The HMI 133 may include a touch-sensitive display screen.

Energy storage device 149 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 149 from power source 180 via an electrical energy transmission cable 182. During a recharging operation of energy storage device 149 from power source 180, electrical transmission cable 182 may electrically couple energy storage device 149 and power source 180. While the vehicle propulsion system is operated to propel the vehicle, electrical transmission cable 182 may be disconnected between power source 180 and energy storage device 149. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 149 from power source 180. For example, energy storage device 149 may receive electrical energy from power source 180 via one or more of electromagnetic induction, radio waves, and electromagnetic resonance. As such, it should be appreciated that any suitable approach may be used for recharging energy storage device 149 from a power source that does not comprise part of the vehicle. In this way, motor 120 may propel the vehicle by utilizing an energy source other than the fuel utilized by engine 110.

Fuel system 192 may periodically receive fuel from a fuel source residing external to the vehicle. As a non-limiting example, vehicle propulsion system 100 may be refueled by receiving fuel via a fuel dispensing device 147 as indicated by arrow 172. In some examples, fuel tank 145 may be configured to store the fuel received from fuel dispensing device 147 until it is supplied to engine 110 for combustion. In some examples, control system 190 may receive an indication of the level of fuel stored at fuel tank 145 via a fuel level sensor. The level of fuel stored at fuel tank 145 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s). The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters and ambient conditions such as local barometric pressure and humidity. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc., may be additionally or alternatively utilized in conjunction with the onboard navigation system to conduct route learning of commonly traveled routes by the vehicle.

FIG. 2 shows a schematic depiction 200 of a vehicle system 206. It may be understood that vehicle system 206 may comprise the same vehicle system as vehicle propulsion system 100 depicted at FIG. 1. The vehicle system 206 includes an engine system 208 coupled to an emissions control (EVAP) system 251 and a fuel system 218. It may be understood that fuel system 218 may comprise the same fuel system as fuel system 140 depicted at FIG. 1. EVAP system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. While not explicitly shown, it may be understood that each cylinder may include one or more intake valve(s) and one or more exhaust valve(s). The engine 210 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and intake air filter 215 positioned upstream of throttle 262.

In the depicted embodiment, engine 110 is a boosted engine coupled to a turbocharger including a compressor 114 driven by a turbine 116. Specifically, fresh air is introduced along intake passage 242 into engine 110 via intake air filter 215 and flows to compressor 114. The compressor may be any suitable intake-air compressor, such as a motor-driven or driveshaft driven supercharger compressor. In engine system 110, the compressor is a turbocharger compressor mechanically coupled to turbine 116 via a shaft 56, the turbine 116 driven by expanding engine exhaust. Compressor 114 may be coupled through charge-air cooler (not shown) to throttle 262. From the compressor, the compressed air charge flows through the charge-air cooler and the throttle 262 to the intake manifold 244.

To assist the turbocharger, an electric booster 155 (also referred herein as e-booster) may be incorporated into the vehicle propulsion system downstream of the compressor 114. A motor in the electric booster 155 may be powered via an onboard energy storage device (such as energy storage device 149 in FIG. 1), which may comprise a battery, capacitor, supercapacitor, etc. Electric booster 155 may be an electric supercharger used for further increasing air pressure of air exiting the compressor 126. In one example, electric booster 155 may be activated (actuated on) in response to a demand for wheel torque, in order to provide the desired boost air rapidly to the engine without delay as may otherwise occur if the turbocharger was utilized without the electric booster. In such an example, responsive to the turbocharger spooling up to a threshold speed (e.g. 70,000 rpm), the electric booster 155 may be actuated off, or deactivated. More specifically, operational control of the electric booster 155 may be under control of the vehicle controller (e.g. controller 12). For example, the controller may send a signal to an electric booster actuator, which may actuate on the electric booster. In another example, the controller may send a signal to the electric booster actuator, which may actuate off the electric booster. In one example the electric booster actuator may comprise a motor which drives the compression of air.

Electric booster 155 may be housed in an electric booster conduit including a first electric booster conduit 254 and a second electric booster conduit 255. The first electric booster conduit 254 may be fluidically coupled to the intake passage 242 downstream of the compressor 114. As an example, air may be drawn into electric booster 155 via the first electric booster conduit 254, and compressed air may exit electric booster 155 and be routed via the second electric booster conduit 255 to intake passage 242. In this way, compressed air may be routed to engine intake 244. The second electric booster conduit 255 may include a first bypass valve 256 which may be regulated to adjust flow of air from downstream of the compressor 114 to the electric booster 155 and from the electric booster 155 back to the intake passage 242. If the first bypass valve 256 is in a closed position, and the electric booster 155 is not operated, air from downstream of the compressor 114 may not enter through the first electric booster conduit 254. A third electric booster conduit 258 may couple the first electric booster conduit 254 downstream of the electric booster 155 to the exhaust passage 235 downstream of the exhaust turbine 116 and upstream of the emissions control device 270. The third electric booster conduit 258 may include a second bypass valve 259 regulating flow of compressed air from the electric booster 155 to the exhaust passage 235.

During a first condition, when the electric booster 155 is not operated such as during lower engine torque demand, each of the first bypass valve 256 and the second bypass valve 259 may be maintained in respective closed positions such that air from downstream of the compressor 114 may not enter through the first electric booster conduit 254 and/or the second electric booster conduit 255. During a second condition, when the electric booster 155 is operated to provide higher boost pressure, such as during higher engine torque demand, the first bypass valve 256 may be opened while the second bypass valve 259 may be closed such that air from downstream of the compressor 114 may flow through the first electric booster conduit 254 and return to the intake passage 242 without flowing to the exhaust passage via the third electric booster conduit 258. During a third condition, such as when secondary air flow is desired at the exhaust passage, the electric booster 155 is operated with the first bypass valve 256 closed and the second bypass valve 259 open such that air from downstream of the compressor 114 may enter through the first electric booster conduit 254 and flow to the exhaust passage, upstream of the emissions control device via the third electric booster conduit 258 without returning to the intake passage 242 via the second electric booster conduit 255.

Fuel system 219 may include a fuel tank coupled to a fuel pump system 230. It may be understood that fuel tank 128 may comprise the same fuel tank as fuel tank 144 depicted above at FIG. 1. The fuel pump 230 may include one or more pumps for pressurizing fuel delivered to the injectors of engine 210, such as the example fuel injector 266 shown. While a single fuel injector 266 is shown, additional injectors are provided for each cylinder. It will be appreciated that fuel system 219 may be a return-less fuel system, a return fuel system, or various other types of fuel system.

Vapors generated in fuel system 219 may be routed to an EVAP system 251 which includes a fuel vapor canister 222 via vapor recovery line 278, before being purged to the engine air intake 223. Vapor recovery line 278 may be coupled to fuel tank via one or more conduits and may include one or more valves such as the fuel tank isolation valve (FTIV) 252 for isolating the fuel tank during certain conditions.

EVAP system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. EVAP system 251 may further include a canister ventilation path or vent line 227 which may route gases out of the fuel vapor canister 222 to the atmosphere when storing, or trapping, fuel vapors from fuel system 219.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more canister temperature sensors 232 may be coupled to and/or within canister 222.

Vent line 227 may also allow fresh air to be drawn into canister 222 when purging stored fuel vapors from fuel system 219 to engine air intake 223 via purge line 228 and purge valve 261. The purge valve 261 may be normally closed but may be opened during certain conditions so that vacuum from engine intake manifold 244 is provided to the fuel vapor canister for purging. In some examples, vent line 227 may include an air filter 257 disposed therein upstream of the canister 222.

In some examples, the flow of air and vapors between canister 222 and the atmosphere may be regulated by a canister vent valve 265 coupled within vent line 227. When included, the canister vent valve 265 may be a normally open valve, so that fuel tank isolation valve 252 (FTIV) may control venting of fuel tank with the atmosphere. FTIV 252 may be a normally closed valve, that when opened, allows for the venting of fuel vapors from fuel tank to fuel vapor canister 222. Fuel vapors may then be vented to atmosphere, or purged to engine air intake 223 via canister purge valve 261.

Fuel system 219 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open FTIV 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation FTIV 252, while maintaining canister purge valve 261 closed, to depressurize the fuel tank before allowing fuel to be added therein. As such, FTIV 252 may be kept open during the refueling operation to allow refueling vapors to be stored in the canister. After refueling is finished, the FTIV 252 may be closed.

As yet another example, the fuel system may be operated in a canister purging mode (e.g., after an emission control device light-off temperature has been attained and with the engine combusting air and fuel), wherein the controller 212 may open canister purge valve 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Diagnostics of the EVAP system may be carried out opportunistically to ensure robustness and efficient operation of the system. Undesired evaporative emission detection routines may be intermittently performed by controller 212 on fuel system 218 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum.

Figure 3A:
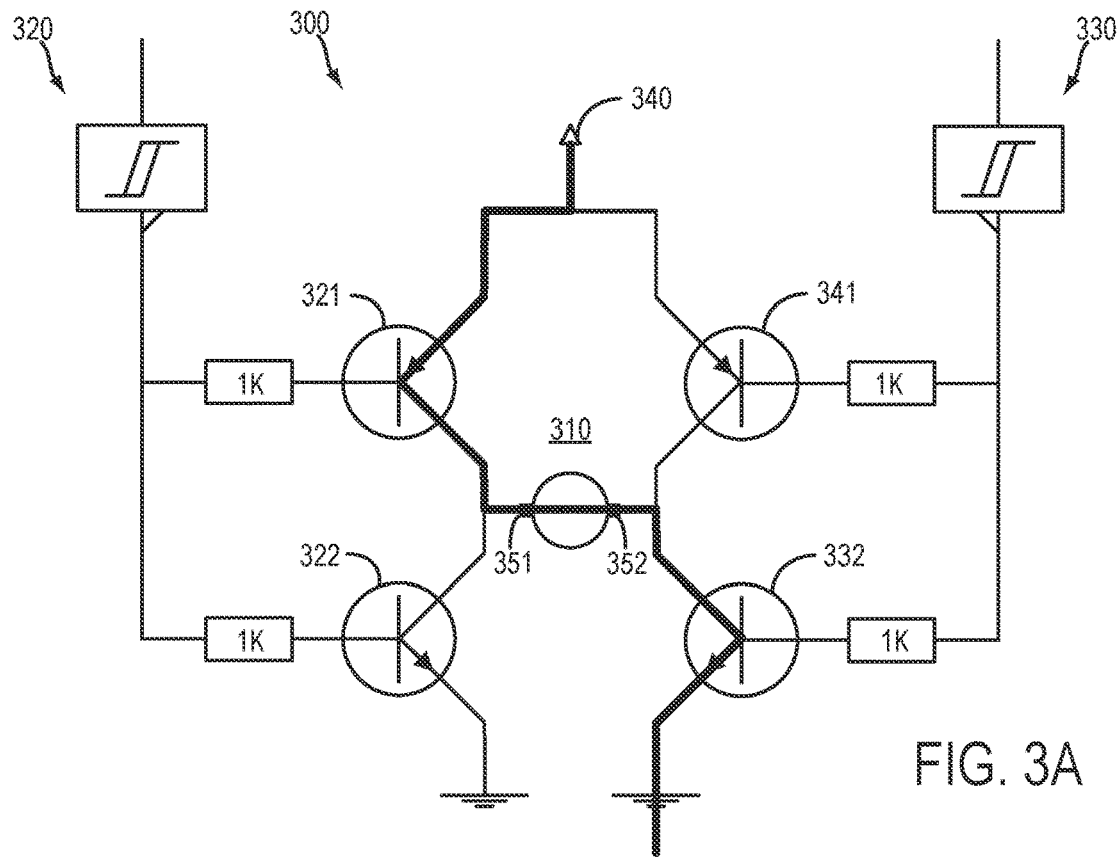
FIGS. 3A and 3B schematically show an example H-bridge circuit which may be used to rotate the electric booster in a forward or reverse direction.

Undesired evaporative emission tests may be performed by an evaporative leak check module (ELCM) 295 communicatively coupled to controller 212. ELCM 295 may be coupled in vent line 227, upstream of the canister 222 and the vent valve 229. In an alternate embodiment, the ELCM 295 may be coupled in vent line 227, between the canister 222 and the vent valve 229. ELCM 295 may include a vacuum pump 298 configured to apply a negative pressure to the fuel system when in a first conformation, such as when administering a leak test. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump 298 may be a reversible vacuum pump, and thus configured to apply a positive pressure to the fuel system when a bridging circuit is reversed placing the pump in a second conformation. The bridging circuit used to reverse the operation of the pump 298 is shown in FIGS. 3A, B.

An air conduit 284 may couple the vent line 227 upstream of the ELCM vacuum pump 298 to the exhaust passage 235 upstream of the emissions control device 270. An EVAP system valve 282 may be coupled to the air conduit 284 to regulate air flow from the vent line 227 to the exhaust passage 235 via the air conduit 284. A first end of the first air conduit 284 may be coupled to the vent line 227 between the fuel vapor canister 222 and the ELCM pump 298 and a second end of the first air conduit 284 may be coupled to the exhaust passage 235 upstream of the exhaust catalyst 270. During a first condition, when the ELCM pump 298 may be operated as vacuum pump such as during fuel system diagnostics, the CVV 265 may be in an open position while the EVAP system valve 282 may be in a closed position to restrict airflow between the exhaust system and the vent line 227 via the air conduit 284. During a second condition, when the ELCM pump 298 may be operated to generate positive pressure, such as to flow secondary air to the exhaust system, the CVV 265 may be closed and the EVAP system valve 282 may be opened to allow air to flow from the ELCM pump 298 to the exhaust passage upstream of the emissions control device 270 while not entering the canister 222.

The engine exhaust system 225 includes an exhaust manifold 248 leading to an exhaust passage 235 that routes exhaust gas to the atmosphere. An exhaust temperature sensor 237 may be coupled to the exhaust passage 235 upstream or downstream of the emissions control device 270. The engine exhaust system 225 may include one or more exhaust catalyst 270, which may be mounted in a close-coupled position in the exhaust. One or more emission control devices may include a three-way catalyst, lean NOx trap, oxidation catalyst, selective reduction catalyst, etc. In addition, a particulate matter filter may be positioned downstream of the exhaust catalyst 270. When the engine is started under cold ambient conditions, or when the engine is started after a sufficiently long period of being shutdown (e.g., while the vehicle was being propelled via the motor or while the vehicle was shutdown), the exhaust catalyst (e.g., the oxidation catalyst or catalytic converter) may be at a temperature lower than its activation temperature (also known as the light-off temperature). As such, engine cold-start emissions generated before light-off of the exhaust catalytic converter contribute a large percentage of the total exhaust emissions. Further, during cold start, a portion of the fuel injected to the engine cylinders may remain unburnt and may escape to the exhaust passage 235.

During a cold-start condition, the ELCM pump 298 may be activated in a pressure mode (such as to generate positive pressure), the first valve 282 housed in the first air conduit 284 may be opened, and the CVV 265 may be closed to flow pressurized air from the pump 298 to the exhaust passage 235 upstream of the exhaust catalyst 270. During operation of the pump, ambient air entering the vent line may be pressurized at the pump, and the pressurized air may be routed to the exhaust passage via the first air conduit 284. Also, during the cold-start condition, the electric booster 155 coupled to the first electric booster conduit 254 may be operated, a first bypass valve 256 housed in a second electric booster conduit 255 may be closed, and a second bypass valve 259 housed in the third electric booster conduit 258 may be opened to flow pressurized air from the electric booster 155 to the exhaust passage 235 upstream of the exhaust catalyst 270. Ambient air from the intake passage may enter the electric booster 155 via the first electric booster conduit 254, and after pressurization of the ambient air at the electric booster, the pressurized air from the electric booster may be routed to the exhaust passage 235 via the third electric booster conduit 258. In response to the exhaust temperature increasing to a threshold temperature, the ELCM pump may be deactivated, the first valve may be closed, and the CVV may be opened. Similarly, in response to the exhaust temperature increasing to the threshold temperature, the electric booster may be deactivated, the first bypass valve may be opened, and the second bypass valve may be closed.

In the example vehicle system 206, provisions for secondary airflow to the exhaust passage from one or both of the electric booster 155 and the ELCM pump 298 are shown. As one example, based on the difference between the temperature at the exhaust catalyst 270 (as estimated based on output of the temperature sensor 237) and the light-off temperature of the exhaust catalyst 270, the source of secondary airflow may be selected. In one example, if the difference in temperature is higher than a threshold temperature, the electric booster 155 may be operated to provide compressed air to the exhaust passage 235 whereas if the difference in temperature is lower than the threshold temperature, the ELCM pump 298 may be operated to provide compressed air to the exhaust passage 235. In another example, both the ELCM pump 298 and the electric booster 155 may be operated to flow secondary air to the exhaust passage 235 to expedite catalyst light-off.

In alternate embodiments, the vehicle system 206 may include either the electric booster 155 along with the third electric booster conduit 258 for supplying secondary air to the exhaust passage or the ELCM pump 298 along with the air conduit 284 for supplying secondary air to the exhaust passage and the available component (ELCM pump or electric booster) may be used for secondary air flow during cold-start conditions.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust temperature sensor 237, manifold absolute pressure (MAP) sensor, mass air flow (MAF) sensor, and canister temperature sensor 232. Other sensors such as pressure, temperature, air/fuel ratio, and composition sensors may be coupled to various locations in the vehicle system 206. As another example, the actuators may include throttle 262, fuel tank isolation valve 253, canister purge valve 261, and canister vent valve 297, first bypass valve 256, second bypass valve 259, and EVAP system valve 282. The controller may receive input data from the various sensors, process the input data, and trigger the actuators in response to the processed input data based on instruction or code programmed therein corresponding to one or more routines. In one example, during a cold-start condition, the controller may activate the electric booster 155 or the ELCM pump 298 to flow secondary air to the emissions control device 270.

Figure 3B:
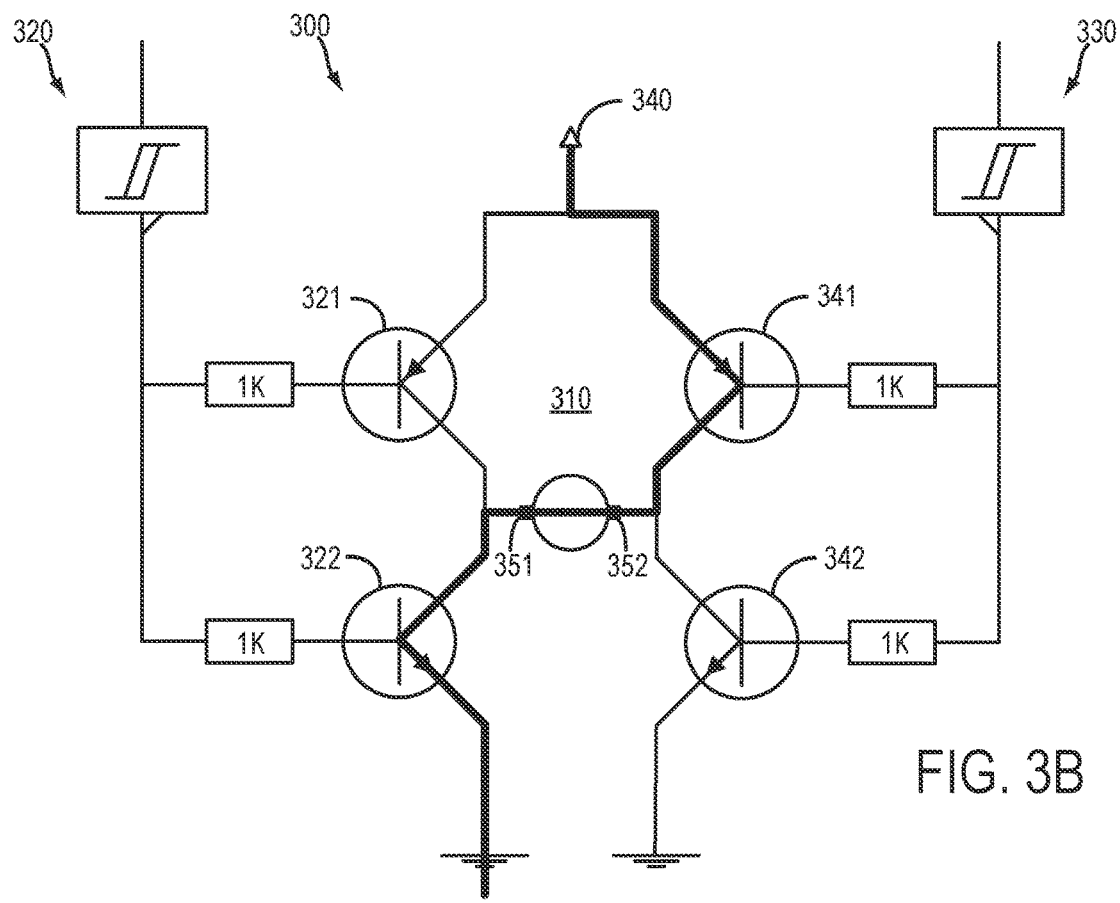

FIGS. 3A and 3B show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 342 are activated (energized), while transistors 322 and 341 are off. In this configuration, the left lead 351 of motor 310 is connected to power source 340, and the right lead 352 of motor 310 is connected to ground. In this way, motor 300 may run in a forward (or default) direction. When operating the electric booster in a forward direction via the motor, the electric booster may be operated to provide boost pressure (causing an increase in pressure at the intake manifold). Additionally and/or alternatively, when operating the electric booster in a forward direction via the motor, the engine (and motor or another motor) may be in a drive mode to drive the vehicle.

In FIG. 3B, transistors 322 and 341 are activated (energized), while transistors 321 and 342 are off. In this configuration, the right lead 352 of motor 310 is connected to power source 340, and the left lead 351 of motor 310 is connected to ground. In this way, motor 310 may run in a reverse direction. When operating the electric booster in a forward direction via the motor, the intake manifold may be evacuated causing a decrease in pressure (generation of vacuum) in the intake manifold.

In this way, the systems of FIGS. 1-3A, B provide for a system for a vehicle, comprising: an evaporative leak check module (ELCM) including a pump coupled to a vent line of an evaporative emissions control (EVAP) system, an air conduit coupled to the vent line between the pump and a fuel vapor canister of the EVAP system at one end and to an exhaust passage upstream of an exhaust catalyst at another end, a first valve housed in the air conduit, and a canister vent valve (CVV) coupled to the vent line between the pump and the fuel vapor canister. During a cold-start condition, the pump may be operated, via a H-bridge, as a positive pressure pump, the first valve may be opened, and the CVV may be closed to route pressurized air from the pump to the exhaust passage. In response to a temperature of the exhaust catalyst increasing to above a light-off temperature of the exhaust catalyst, the pump may be disabled, the first valve may be closed, and the CVV may be opened.

Figure 4:
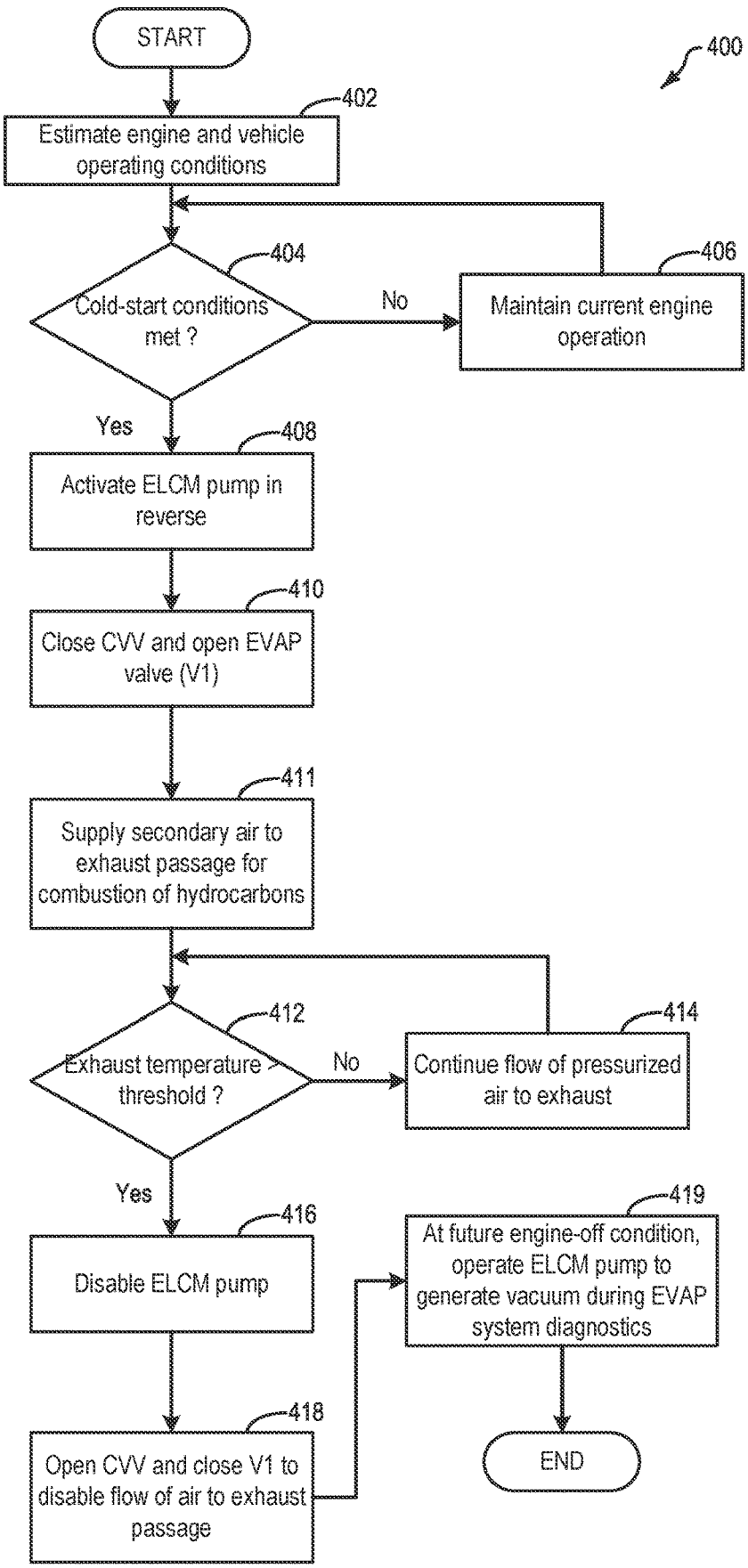
FIG. 4 shows a flowchart for an example method for supplying secondary air to an exhaust passage of the engine by operating a pump of the ELCM.

FIG. 4 shows an example method 400 that may be implemented for supplying secondary air to an exhaust passage of the engine by operating a pump (such as pump 298 in FIG. 2) of an evaporative leak check module (such as ELCM 295 in FIG. 2) during cold start conditions. Instructions for carrying out method 400 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

Method 400 begins at 402 by estimating and/or measuring engine and vehicle operating conditions. Engine and vehicle operating conditions may include vehicle speed, engine speed and load, ambient humidity, ambient temperature, ambient pressure, MAF, a position of the throttle, torque demand, exhaust catalyst temperature, duration (or distance) elapsed since a last engine start, vehicle mode of operation (e.g., whether the vehicle is being operated in an electric mode, engine mode, or assist mode), etc.

At 404, the routine includes determining if cold-start conditions are met. A cold-start conditions may include a lower than threshold temperature of an exhaust catalyst (such as emissions control device 270 in FIG. 2) at engine start after a period of inactivity. The threshold temperature of the catalyst may correspond to the light-off temperature. Below the light-off temperature, the exhaust catalyst may not be able to effectively treat the reactive constituents of the exhaust gas. Engine cold-start may also be inferred based on a lower than threshold engine temperature and/or ambient temperature upon engine start.

If it is determined that cold-start conditions are absent, current cold-start conditions, current engine operation may be maintained. A first EVAP system valve, V1 (such as EVAP system valve 282 in FIG. 2) coupled to an air conduit (such as air conduit 284 in FIG. 2) coupling a vent line of the EVAP system upstream of the ELCM to the exhaust passage upstream of the exhaust catalyst may be maintained in a closed position to avert airflow between the exhaust passage and the EVAP system via the air conduit. A canister vent valve (such as CVV 265 in FIG. 2) coupled to the vent line between the ELCM and a fuel vapor canister may be maintained in an open position. In one example, the pump (such pump 298 in FIG. 2) of the ELCM may be maintained deactivated during engine operation. During future engine-off conditions, upon conditions being met for a diagnostics test for the EVAP system, the ELCM pump may be operated in a first mode (such as a forward, vacuum pump) to generate vacuum in the EVAP system, and the pressure in the EVAP system may be monitored to detect any degradation in the EVAP system.

If it is determined that conditions are met for a cold-start, it may be inferred that heating of the exhaust catalyst and/or oxidation of unburnt hydrocarbons in the exhaust passage may be desired. At 408, the ELCM pump may be activated to operate in a reverse direction (second mode). The ELCM pump is generally formed as a vacuum pump used for vacuum generation during an EVAP system diagnostics may also be operated in reserve to generate positive airflow (pressure). The H-bridge shown in FIGS. 3A-B may be used to selectively operate the pump in a forward and reverse direction.

At 410, the CVV may be closed to disable fluidic communication between the ELCM and the fuel vapor canister. The EVAP valve (V1) may be opened to establish fluidic communication between the ELCM pump and the exhaust passage. The controller may send a first signal to the actuator of the CVV to actuate the CVV to a closed position and the controller may send a second signal to an actuator of the V1 valve to actuate the valve to an open position.

At 411, secondary air is supplied from the ELCM pump to the exhaust passage upstream of the catalyst via the air conduit for combustion of hydrocarbons. As the ELCM pump is operated in reverse, an airflow is generated at the ELCM which may then be routed to the exhaust passage via the air conduit coupling the vent line to the exhaust passage. Since the CVV is closed, the pressurized air may not enter the canister. As the pressurized air flows into the exhaust passage, the unburnt hydrocarbons in the exhaust gas may be combusted in the exhaust passage upstream of the catalyst. Combustion of hydrocarbons in the exhaust passage generates heat which may then increase the temperature of the exhaust gas and the catalyst. In this way, the unburnt hydrocarbons may be averted from escaping to the atmosphere as tailpipe emissions and used for heating the catalyst during a cold-start.

At 412, the routine includes determining if the exhaust temperature, as estimated via an exhaust temperature sensor, has increased to a threshold temperature. The threshold temperature may be pre-calibrated based on the catalyst light-off temperature. During a cold-start the exhaust temperature is lower than the threshold temperature. Due to the combustion of hydrocarbons, the exhaust temperature may steadily increase. If it is determined that the exhaust temperature continues to be lower than the threshold temperature, at 414, flow of pressurized air from the ELCM pump to the exhaust passage via the air conduit may be continued to allow combustion of hydrocarbons at the exhaust passage to persist.

If it is determined that the exhaust temperature increases to above the threshold temperature, it may be inferred that the exhaust passage is sufficiently heated and the catalyst light-off has been attained. Upon catalyst light-off, the catalyst may completely treat the exhaust gas before it exits through the tailpipe. It may be inferred that further supply of secondary air to the exhaust passage is no longer desired. Therefore, at 416, the ELCM pump may be disabled to discontinue generation of pressurized air at the EVAP system. At 418, the CVV may be opened to establish fluidic communication between the ELCM and the fuel vapor canister. Further, the EVAP system valve, V1 may be actuated to a closed position to suspend fluidic communication between the ELCM and the exhaust passage.

At 419, during a future engine-off conditions, upon conditions being met for an EVAP system diagnostics, the ELCM pump may be operated to conduct the EVAP system diagnostics. Conditions for EVAP system diagnostics may include elapsing of a higher than threshold duration since an immediately previous EVAP diagnostics. A reference check may be performed whereby a vacuum may be drawn across the reference orifice of the ELCM, where the resulting vacuum level comprises a vacuum level indicative of an absence of undesired evaporative emissions. For example, following the reference check, the fuel system and evaporative emissions system may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

In this way, during a first condition, operating a pump of the ELCM may be operated in a positive pressure mode, a first valve housed in an air conduit may be opened, the CVV housed in a vent line of the EVAP system may be closed, and pressurized air from the pump may be routed to the exhaust passage upstream of an exhaust catalyst, and during a second condition, the pump of the ELCM may be operated in a negative pressure mode, the first valve may be closed, the CVV may be opened, and vacuum may be generated in the EVAP system. When the pump is operated in the positive pressure mode, air flowing through the pump is pressurized to generate a positive pressure in the system and when the pump is operated in the negative pressure mode, the pump operates as a vacuum pump to draw out air from the system. The first condition may include an engine cold-start condition with a temperature of the exhaust catalyst being lower that it's light-off temperature, and the second condition may include an engine-off condition upon receiving a request for carrying out a diagnostic routine of the EVAP system. In response to attainment of light-off temperature of the exhaust catalyst, the pump may be deactivated, the first valve may be closed, and the CVV may be opened.

Figure 5:
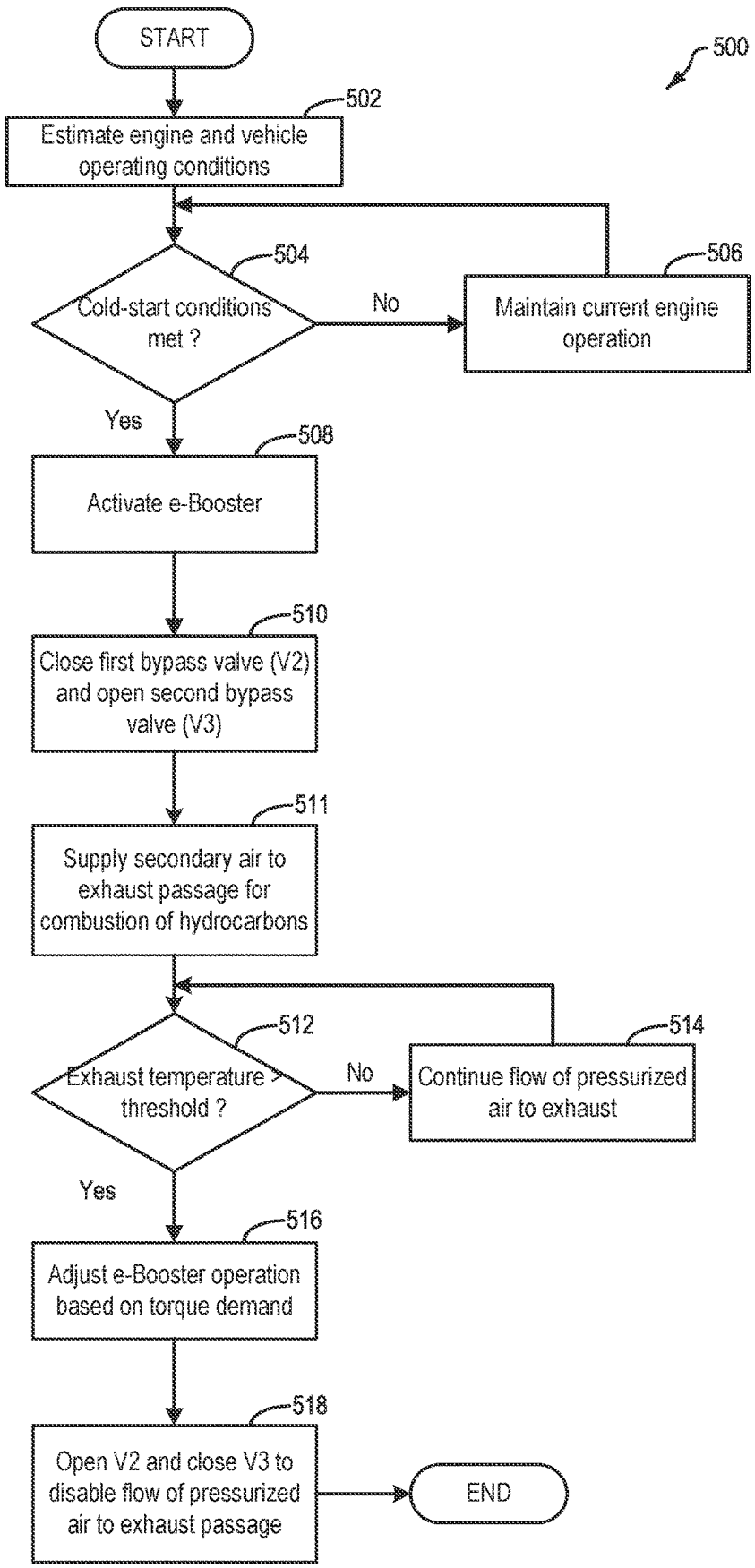
FIG. 5 shows a flowchart for an example method for supplying secondary air to the exhaust passage by operating the electric booster.

FIG. 5 shows an example method 500 that may be implemented for supplying secondary air to an exhaust passage of the engine by operating an electric booster (such as electric booster 155 in FIG. 1, also referred herein as e-booster) coupled to an intake system of the engine. Method 500 begins at 502 by estimating and/or measuring engine and vehicle operating conditions. Engine and vehicle operating conditions may include vehicle speed, engine speed and load, ambient humidity, ambient temperature, ambient pressure, MAF, a position of the throttle, torque demand, exhaust catalyst temperature, duration (or distance) elapsed since a last engine start, vehicle mode of operation (e.g., whether the vehicle is being operated in an electric mode, engine mode, or assist mode), etc.

At 504, the routine includes determining if cold-start conditions are met. A cold-start conditions may include a lower than threshold temperature of an exhaust catalyst (such as emissions control device 270 in FIG. 2) at engine start after a period of inactivity. The threshold temperature of the catalyst may correspond to the light-off temperature. Below the light-off temperature, the exhaust catalyst may not be able to effectively treat the reactive constituents of the exhaust gas. Engine cold-start may also be inferred based on a lower than threshold engine temperature and/or ambient temperature upon engine start.

If it is determined that cold-start conditions are absent, current engine operation may be maintained. A first bypass valve, V2 (such as first bypass valve 256 in FIG. 2) coupled to a second electric booster conduit may be maintained in an open position while a second bypass valve, V2 (such as second bypass valve 259 in FIG. 2) coupled to a third electric booster conduit may be maintained in a closed position that intake air entering the electric booster via the first electric booster conduit may return to the intake passage via the second electric booster conduit and not flow to the exhaust passage via the third electric booster conduit. The electric booster may be operated to supply boost pressure to the engine.

If it is determined that conditions are met for a cold-start, it may be inferred that heating of the exhaust catalyst and/or oxidation of unburnt hydrocarbons in the exhaust passage may be desired. At 508, the electric booster may be activated to pressurize intake air entering the electric booster from downstream of an intake compressor via the first electric booster conduit.

At 510, the first bypass valve (V2) may be closed to disable fluidic communication between the electric booster and the second electric booster conduit. The second bypass valve (V3) may be opened to establish fluidic communication between the electric booster and the exhaust passage. The controller may send a first signal to the actuator of V2 valve to actuate V2 valve to a closed position and the controller may send a second signal to an actuator of the V3 valve to actuate the V3 valve to an open position. By closing V2, although air from the intake passage may flow to the electric booster via the first electric booster air compressed at the electric booster may not flow back to the intake passage.

At 511, secondary air is supplied from the electric booster to the exhaust passage upstream of the catalyst via the third electric booster conduit for combustion of hydrocarbons. The air entering the electric booster from the intake passage via the first electric booster conduit is pressurized at the electric booster and instead of returning to the intake passage via the second electric booster (as V2 is closed), the pressurized air is routed to the exhaust passage via the third electric booster conduit. As the pressurized air flows into the exhaust passage, the unburnt hydrocarbons in the exhaust gas may be combusted in the exhaust passage upstream of the catalyst. Combustion of hydrocarbons in the exhaust passage generates heat which may then increase the temperature of the exhaust gas and the catalyst. In this way, the unburnt hydrocarbons may be averted from escaping to the atmosphere as tailpipe emissions and used for heating the catalyst during a cold-start.

At 512, the routine includes determining if the exhaust temperature, as estimated via an exhaust temperature sensor, has increased to a threshold temperature. The threshold temperature may be pre-calibrated based on the catalyst light-off temperature. During a cold-start the exhaust temperature is lower than the threshold temperature. Due to the combustion of hydrocarbons, the exhaust temperature may steadily increase. If it is determined that the exhaust temperature continues to be lower than the threshold temperature, at 514, flow of pressurized air from the electric booster to the exhaust passage via the third electric booster conduit may be continued to continue combustion of hydrocarbons at the exhaust passage.

If it is determined that the exhaust temperature increases to above the threshold temperature, it may be inferred that the exhaust passage is sufficiently heated and the catalyst light-off has been attained. Upon catalyst light-off, the catalyst may completely treat the exhaust gas before it exits through the tailpipe. It may be inferred that further supply of secondary air to the exhaust passage is no longer desired. Therefore, at 516, operation of the electric booster may be adjusted based on torque demand. In one example, during a higher than threshold torque demand (high engine load), the electric booster may be continued to be operated to provide additional boost pressure. In another example, during a lower than threshold torque demand (low engine load), the electric booster may be deactivated.

At 518, the first bypass valve V2 may be opened to enable fluidic communication between the electric booster and the second electric booster conduit and the second bypass valve V3 may be may be closed to disable fluidic communication between the electric booster and the exhaust passage. Due to the opening of V2 and closing of V3, pressurized air from the electric booster may return to the intake passage and flow to the engine cylinders instead of flowing to the exhaust passage.

Figure 6:
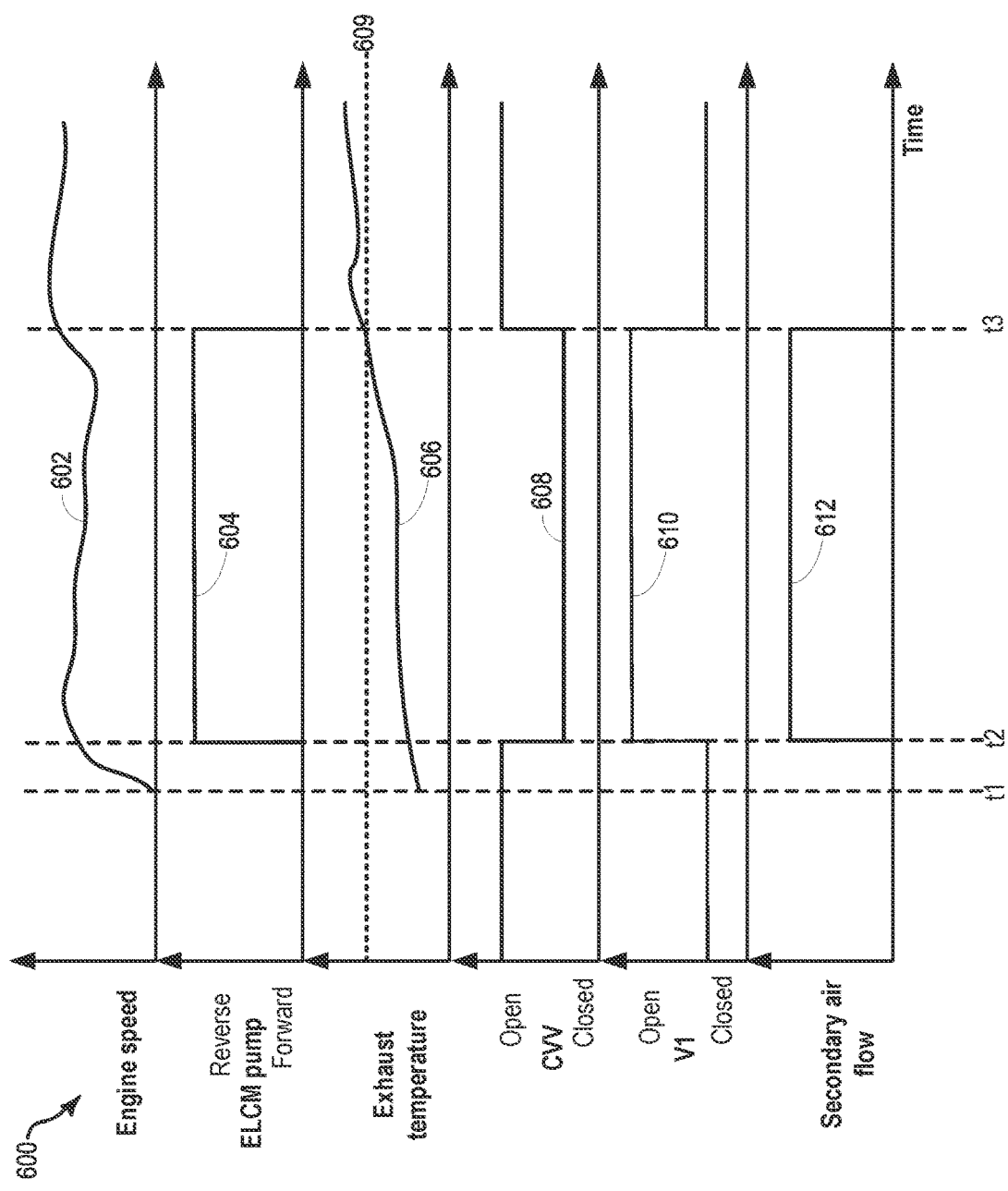
FIG. 6 is an example of secondary air supply from the ELCM pump to the exhaust passage.

FIG. 6 shows an example timeline 600 illustrating secondary air supply from a pump (such as pump 298 in FIG. 2) of an evaporative leak check module (ELCM) to an exhaust passage (such as exhaust passage 235 in FIG. 2) upstream of an exhaust emissions control device (such as device 270 in FIG. 2). The horizontal (x-axis) denotes time and the vertical markers t1-t3 identify significant times in secondary air supply for expedited emissions control device heating.

The first plot, line 602, shows a change in engine speed as estimated via a crankshaft position sensor. The second plot, line 604, shows operation of the ELCM pump. The pump is capable of being operated in a forward mode to generate vacuum and in a reverse mode to generate pressurized air. The pump can be switched from one mode of operation to another by using a H-bridge. The third plot, line 606, shows a change in exhaust temperature over time, as estimated via output of an exhaust temperature sensor (such as temperature sensor 237 in FIG. 2). Dashed line 609 denotes a threshold exhaust temperature above which light-off of the exhaust emissions control device is attained and further supply of secondary air is not desired. The threshold exhaust temperature is pre-calibrated based on the light-off temperature of the exhaust emissions control device. The fourth plot, line 608, shows an opening of a canister vent valve (such as CVV 265 in FIG. 2) coupled to the vent line between the ELCM pump and a fuel vapor canister. The fifth plot, line 610, shows an opening of a first EVAP system valve (such as EVAP system valve 282 in FIG. 2) housed in an air conduit (such as air conduit 284 in FIG. 2) coupling the vent line upstream of the ELCM pump to the exhaust passage upstream of the emissions control device. The sixth plot, line 612, shows flow of secondary air from the ELCM pump to the exhaust passage upstream of the emissions control device.

Prior to time t1, the engine is at rest and the vehicle is not propelled via engine torque. The ELCM pump is not being operated. The CVV is maintained in an open position to allow fluidic communication of the canister with atmosphere and V1 is maintained in a closed position to disable air flow between the vent line and the exhaust passage. Secondary air flow is not routed to the engine exhaust passage.

At time t1, engine starts from rest. Due to the exhaust temperature being below the threshold temperature, a cold-start is inferred and heating of the emissions control device is desired. Therefore, at time t2, the ELCM pump is operated in a reverse direction such that ambient air entering the vent line is pressurized at the ELCM pump. The V1 is actuated to an open position while the CVV is actuated to a closed position such that the pressurized air from the ELCM pump is routed to the exhaust passage via the air conduit while the pressurized air does not enter the fuel vapor canister via the vent line. Between time t2 and t3, as the secondary air (pressurized air) flows to the exhaust passage, unburnt hydrocarbons at the exhaust passage are combusted and thermal energy is released upstream of the emissions control device. The thermal energy increases the exhaust temperature.

At time t3, it is observed that the exhaust temperature increases to above the threshold exhaust temperature 609 and it is inferred that further supply of secondary air to the exhaust passage is not desired. The ELCM pump is deactivated, V2 is actuated to a closed position, and the CVV is actuated to an open position. The ELCM pump is maintained inactive until a future engine cold-start or an EVAP system diagnostics during an engine-off condition.

Figure 7:
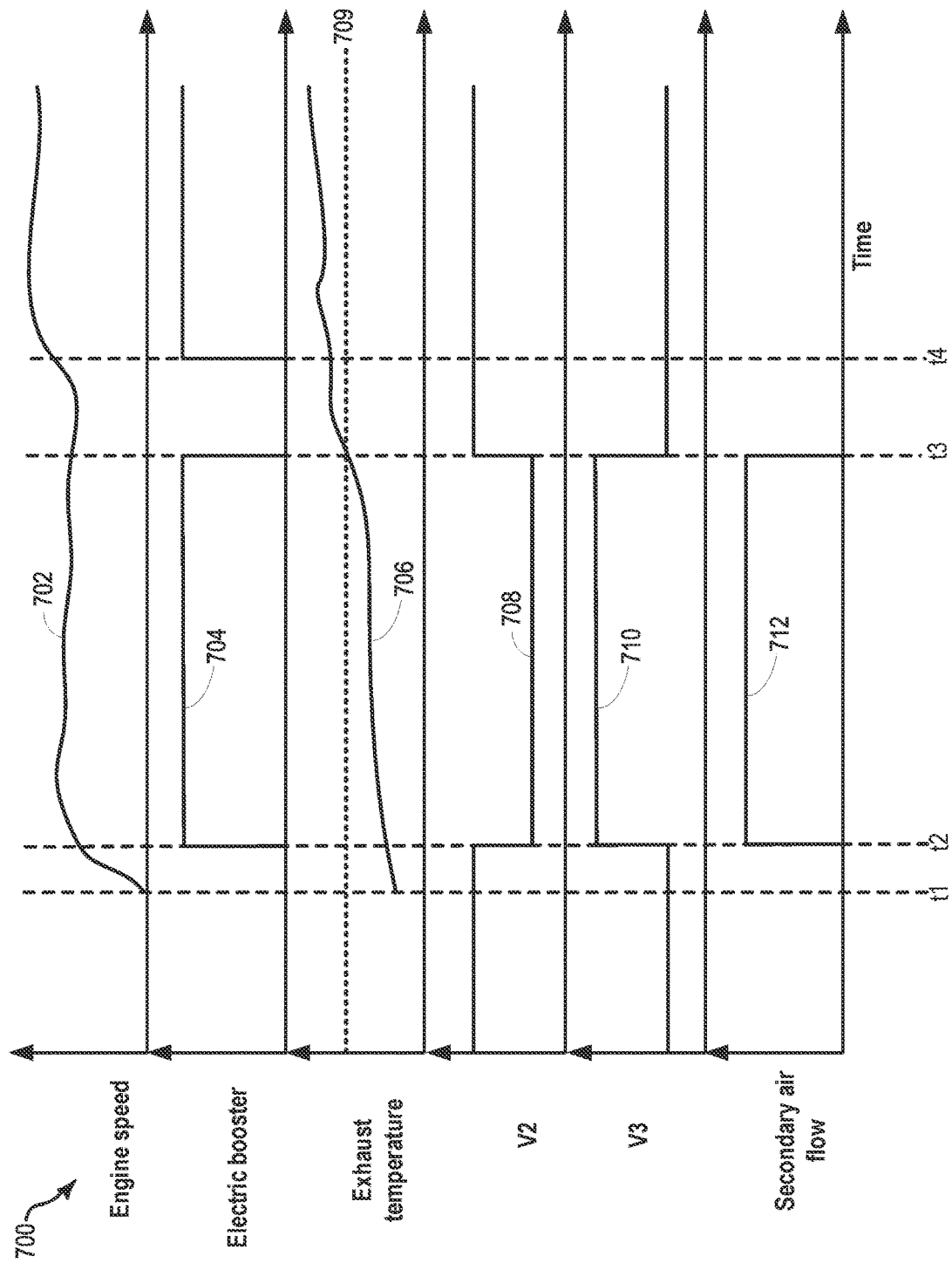
FIG. 7 is an example of secondary air supply from the electric booster to the exhaust passage.

FIG. 7 shows an example timeline 700 illustrating secondary air supply from an electric booster (such as electric booster 155 in FIG. 2) coupled to an engine intake system to an exhaust passage (such as exhaust passage 235 in FIG. 2) upstream of an exhaust emissions control device (such as device 270 in FIG. 2). The horizontal (x-axis) denotes time and the vertical markers t1-t4 identify significant times in secondary air supply for expedited emissions control device heating.

The first plot, line 702, shows a change in engine speed as estimated via a crankshaft position sensor. The second plot, line 704, shows operation of the electric booster to generate pressurized air. The third plot, line 706, shows a change in exhaust temperature over time, as estimated via output of an exhaust temperature sensor (such as temperature sensor 237 in FIG. 2). Dashed line 709 denotes a threshold exhaust temperature above which light-off of the exhaust emissions control device is attained and further supply of secondary air is not desired. The threshold exhaust temperature is pre-calibrated based on the light-off temperature of the exhaust emissions control device. The fourth plot, line 708, shows an opening of a first bypass valve V2 (such as first bypass valve 256 in FIG. 2) coupled to a second electric booster conduit. The fifth plot, line 710, shows an opening of a second bypass valve, V3 (such as second bypass valve 259 in FIG. 2) coupled to a third electric booster conduit coupling the electric booster to the exhaust passage upstream of the emissions control device. The sixth plot, line 712, shows flow of secondary air from the electric booster to the exhaust passage upstream of the emissions control device.

Prior to time t1, the engine is at rest and the vehicle is not propelled via engine torque. The electric booster conduit is not being operated. The first bypass valve V2 is maintained in an open position and the second bypass valve V3 is maintained in a closed. Secondary air flow is not routed to the engine exhaust passage.

At time t1, engine starts from rest. Due to the exhaust temperature being below the threshold temperature, a cold-start is inferred and heating of the emissions control device is desired. Therefore, at time t2, the electric booster is operated such that ambient air entering the electric booster via a first electric booster conduit is pressurized at the electric booster. The V3 is actuated to an open position while the V2 is actuated to a closed position such that the pressurized air from the electric booster is routed to the exhaust passage via the third electric booster conduit while the pressurized air does not return to the intake passage via the second electric booster conduit. Between time t2 and t3, as the secondary air (pressurized air) flows to the exhaust passage, unburnt hydrocarbons at the exhaust passage are combusted and thermal energy is released upstream of the emissions control device. The thermal energy increases the exhaust temperature.

At time t3, it is observed that the exhaust temperature increases to above the threshold exhaust temperature 709 and it is inferred that further supply of secondary air to the exhaust passage is not desired. The electric booster is deactivated, V3 is actuated to a closed position, and the V2 is actuated to an open position. Based on lower torque demand, between time t3 and t4, the electric booster is maintained inactive and intake air is not compressed further at the electric booster.

At time t4, along with an increase in engine load, the engine speed increases. The electric booster is activated to provide increased boost pressure. As V2 is open, the intake air flowing through the electric booster is further pressurized and returned to the intake passage which may then flow to the engine cylinders. Since V3 is closed, the pressurized air does not flow from the electric booster to the exhaust passage and the entire volume of air is used for increased boost. After time t4, engine operation is continued with the electric booster operating to supplement boosted intake airflow.

In this way, by flowing secondary air to the exhaust passage during engine cold-start conditions suing existing engine components such as the electric booster or the ELCM pump, unburnt hydrocarbons may be effectively burnt in the exhaust passage and emissions of such unburnt hydrocarbons may be reduced. The technical effect of using existing engine components for secondary air supply is additional components such as pumps etc. may be eliminated, thereby reducing cost, weight, and packaging concerns. The heat generated from combustion of the hydrocarbons with the supplied secondary air suppled may be used to expediently increase the catalysts' temperature to above their respective light-off temperatures, thereby expediting catalyst light-off and improving emissions quality.

An example method for an engine in a vehicle comprises: opening a first valve housed in a first air conduit to flow pressurized air from a pump of an evaporative leak check module (ELCM) to an exhaust passage upstream of an exhaust catalyst while the pump is operated in a pressure mode. In the preceding example, additionally or optionally, the flowing of the pressurized air to the exhaust passage is carried out during a cold-start condition, the cold-start condition including an exhaust temperature being lower than a threshold temperature. In any or all of the preceding examples, additionally or optionally, a first end of the first air conduit is coupled to a vent line of an evaporative emissions control (EVAP) system between a fuel vapor canister and the pump and wherein a second end of the first air conduit is coupled to the exhaust passage upstream of the exhaust catalyst. In any or all of the preceding examples, the method further comprises, additionally or optionally, prior to activation of the pump in the pressure mode, closing a canister vent valve (CVV) coupled to the vent line between the canister and the first end of the first air conduit. In any or all of the preceding examples, additionally or optionally, flowing the pressurized air includes, during operation of the pump, flowing ambient air into the vent line, pressurizing the ambient air at the pump, and flowing the pressurized air to the exhaust passage via the first air conduit. In any or all of the preceding examples, the method further comprises, additionally or optionally, in response to the exhaust temperature increasing to the threshold temperature, deactivating the pump, closing the first valve, and opening the CVV. In any or all of the preceding examples, the method further comprises, additionally or optionally, after engine shutdown and during an engine-off condition, upon conditions being met for an EVAP system diagnostics, operating the pump in a vacuum mode to build a lower pressure in the EVAP system. In any or all of the preceding examples, the method further comprises, additionally or optionally, during the cold-start condition, operating an electric booster coupled to a first electric booster conduit, closing a first bypass valve housed in a second electric booster conduit, and opening a second bypass valve housed in a third electric booster conduit to flow the pressurized air from the electric booster to the exhaust passage upstream of the exhaust catalyst. In any or all of the preceding examples, additionally or optionally, the second electric booster conduit couples the electric booster to an intake passage via the first bypass valve, and wherein the third electric booster conduit couples the electric booster to the exhaust passage via the second bypass valve. In any or all of the preceding examples, additionally or optionally, flowing the pressurized air from the electric booster to the exhaust passage includes flowing ambient air from the intake passage to the electric booster via the first electric booster conduit, pressurizing the ambient air at the electric booster, and then flowing the pressurized air from the electric booster to the exhaust passage via the third electric booster conduit. In any or all of the preceding examples, the method further comprises, additionally or optionally, in response to the exhaust temperature increasing to the threshold temperature, deactivating the electric booster, opening the first bypass valve, and closing the second bypass valve. In any or all of the preceding examples, the method further comprises, additionally or optionally, during a higher than threshold engine load, activating the electric booster to increase boosted airflow to engine cylinders via the second electric booster conduit.

Another example method for an engine, comprises: during a first condition, operating a pump of an evaporative leak check module (ELCM) in a positive pressure mode, opening a first valve housed in an air conduit, closing a canister vent valve (CVV) housed in a vent line of an evaporative emissions control (EVAP) system, and routing pressurized air from the pump to an exhaust passage upstream of an exhaust catalyst, and during a second condition, operating the pump of the ELCM in a negative pressure mode, closing the first valve, opening the CVV, and generating vacuum in the EVAP system. In the preceding example, additionally or optionally, the first condition includes an engine cold-start condition with a temperature of the exhaust catalyst being lower that it's light-off temperature, and the second condition includes an engine-off condition upon receiving a request for carrying out a diagnostic routine of the EVAP system. In any or all of the preceding examples, additionally or optionally, opening the first valve establishes fluidic communication between the pump and the exhaust passage via the air conduit and closing the CVV disables fluidic communication between the pump and a fuel favor canister of the EVAP system via the vent line. In any or all of the preceding examples, additionally or optionally, the pressurized air reaching the exhaust passage combusts with unburnt hydrocarbons in the exhaust passage to generate thermal energy for heating the exhaust catalyst. In any or all of the preceding examples, the method further comprises, additionally or optionally, in response to attainment of light-off temperature of the exhaust catalyst, deactivating the pump, closing the first valve, and opening the CVV.

Another example for an engine, comprises: an evaporative leak check module (ELCM) including a pump coupled to a vent line of an evaporative emissions control (EVAP) system, an air conduit coupled to the vent line between the pump and a fuel vapor canister of the EVAP system at one end and to an exhaust passage upstream of an exhaust catalyst at another end, a first valve housed in the air conduit, and a canister vent valve (CVV) coupled to the vent line between the pump and the fuel vapor canister. In any or all of the preceding examples, additionally or optionally, a controller storing instructions in non-transitory memory that, when executed, cause the controller to: during a cold-start condition, operate the pump, via a H-bridge, as a positive pressure pump, open the first valve, close the CVV, route pressurized air from the pump to the exhaust passage. In any or all of the preceding examples, additionally or optionally, the controller includes further instructions to: in response to a temperature of the exhaust catalyst increasing to above a light-off temperature of the exhaust catalyst, disable the pump, close the first valve, and open the CVV.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
opening a first valve housed in a first air conduit to flow pressurized air from a pump of an evaporative leak check module (ELCM) to an exhaust passage upstream of an exhaust catalyst while the pump is operated in a pressure mode.

2. The method of claim 1, wherein the flowing of the pressurized air to the exhaust passage is carried out during a cold-start condition, the cold-start condition including an exhaust temperature being lower than a threshold temperature.

3. The method of claim 1, wherein a first end of the first air conduit is coupled to a vent line of an evaporative emissions control (EVAP) system between a fuel vapor canister and the pump and wherein a second end of the first air conduit is coupled to the exhaust passage upstream of the exhaust catalyst.

4. The method of claim 3, further comprising, prior to activation of the pump in the pressure mode, closing a canister vent valve (CVV) coupled to the vent line between the canister and the first end of the first air conduit.

5. The method of claim 3, wherein flowing the pressurized air includes, during operation of the pump, flowing ambient air into the vent line, pressurizing the ambient air at the pump, and flowing the pressurized air to the exhaust passage via the first air conduit.

6. The method of claim 4, further comprising, in response to the exhaust temperature increasing to the threshold temperature, deactivating the pump, closing the first valve, and opening the CVV.

7. The method of claim 3, further comprising, after engine shut-down and during an engine-off condition, upon conditions being met for an EVAP system diagnostics, operating the pump in a vacuum mode to build a lower pressure in the EVAP system.

8. The method of claim 2, further comprising, during the cold-start condition, operating an electric booster coupled to a first electric booster conduit, closing a first bypass valve housed in a second electric booster conduit, and opening a second bypass valve housed in a third electric booster conduit to flow the pressurized air from the electric booster to the exhaust passage upstream of the exhaust catalyst.

9. The method of claim 8, wherein the second electric booster conduit couples the electric booster to an intake passage via the first bypass valve, and wherein the third electric booster conduit couples the electric booster to the exhaust passage via the second bypass valve.

10. The method of claim 9, wherein flowing the pressurized air from the electric booster to the exhaust passage includes flowing ambient air from the intake passage to the electric booster via the first electric booster conduit, pressurizing the ambient air at the electric booster, and then flowing the pressurized air from the electric booster to the exhaust passage via the third electric booster conduit.

11. The method of claim 8, further comprising, in response to the exhaust temperature increasing to the threshold temperature, deactivating the electric booster, opening the first bypass valve, and closing the second bypass valve.

12. The method of claim 11, further comprising, during a higher than threshold engine load, activating the electric booster to increase boosted airflow to engine cylinders via the second electric booster conduit.

13. A method for an engine, comprising:
during a first condition, operating a pump of an evaporative leak check module (ELCM) in a positive pressure mode, opening a first valve housed in an air conduit, closing a canister vent valve (CVV) housed in a vent line of an evaporative emissions control (EVAP) system, and routing pressurized air from the pump to an exhaust passage upstream of an exhaust catalyst; and
during a second condition, operating the pump of the ELCM in a negative pressure mode, closing the first valve, opening the CVV, and generating vacuum in the EVAP system.

14. The method of claim 13, wherein the first condition includes an engine cold-start condition with a temperature of the exhaust catalyst being lower that it's light-off temperature, and the second condition includes an engine-off condition upon receiving a request for carrying out a diagnostic routine of the EVAP system.

15. The method of claim 13, wherein opening the first valve establishes fluidic communication between the pump and the exhaust passage via the air conduit and closing the CVV disables fluidic communication between the pump and a fuel favor canister of the EVAP system via the vent line.

16. The method of claim 13, wherein the pressurized air reaching the exhaust passage combusts with unburnt hydrocarbons in the exhaust passage to generate thermal energy for heating the exhaust catalyst.

17. The method of claim 13, further comprising, in response to attainment of light-off temperature of the exhaust catalyst, deactivating the pump, closing the first valve, and opening the CVV.

18. A system for an engine, comprising:
an evaporative leak check module (ELCM) including a pump coupled to a vent line of an evaporative emissions control (EVAP) system;
an air conduit coupled to the vent line between the pump and a fuel vapor canister of the EVAP system at one end and to an exhaust passage upstream of an exhaust catalyst at another end;
a first valve housed in the air conduit; and
a canister vent valve (CVV) coupled to the vent line between the pump and the fuel vapor canister.

19. The system of claim 18, wherein a controller storing instructions in non-transitory memory that, when executed, cause the controller to:
during a cold-start condition, operate the pump, via a H-bridge, as a positive pressure pump, open the first valve, close the CVV, route pressurized air from the pump to the exhaust passage.

20. The system of claim 19, wherein the controller includes further instructions to:
in response to a temperature of the exhaust catalyst increasing to above a light-off temperature of the exhaust catalyst, disable the pump, close the first valve, and open the CVV.

* * * * *